United States Patent [19]
McDowell

[11] Patent Number: 5,909,765
[45] Date of Patent: Jun. 8, 1999

[54] METHOD OF PRODUCING INVESTMENT CASTINGS FOR STEREOLITHOGRAPHY PATTERNS

[75] Inventor: Christopher S. McDowell, Bridgewater, Mass.

[73] Assignee: Johnson & Johnson Professional, Inc., Raynham, Mass.

[21] Appl. No.: 08/953,890

[22] Filed: Oct. 20, 1997

[51] Int. Cl.⁶ .................................. B22C 7/02; B22C 9/04

[52] U.S. Cl. ............................................ 164/516; 164/35

[58] Field of Search .................................. 164/34, 35, 36, 164/516, 235

[56] References Cited

FOREIGN PATENT DOCUMENTS

| | | | |
|---|---|---|---|
| 1185776 | 1/1965 | Germany | 164/34 |
| 45-8401 | 3/1970 | Japan | 164/34 |
| 4-41041 | 2/1992 | Japan | 164/235 |
| 1458063 | 2/1989 | U.S.S.R. | 164/235 |

*Primary Examiner*—Kuang Y. Lin
*Attorney, Agent, or Firm*—Nutter, McClennen & Fish, LLP

[57] ABSTRACT

An investment casting shell is made by providing an investment casting pattern that defines a cavity and filling the cavity with a fluid. The fluid is sealed within the cavity and a ceramic material is applied to the exterior of the pattern. The ceramic-encased pattern is heated and the pattern and fluid are removed from the ceramic.

15 Claims, 3 Drawing Sheets

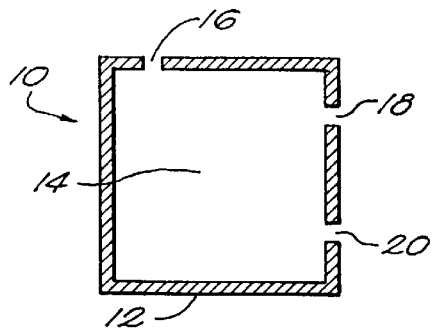
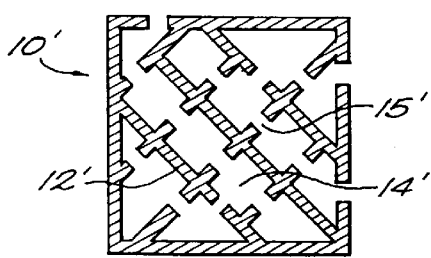
FIG. 1     FIG. 1A
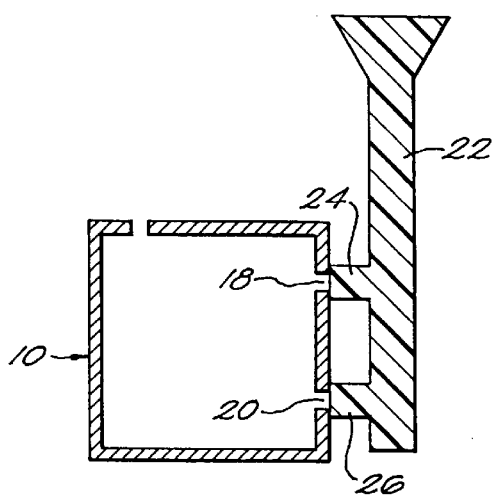
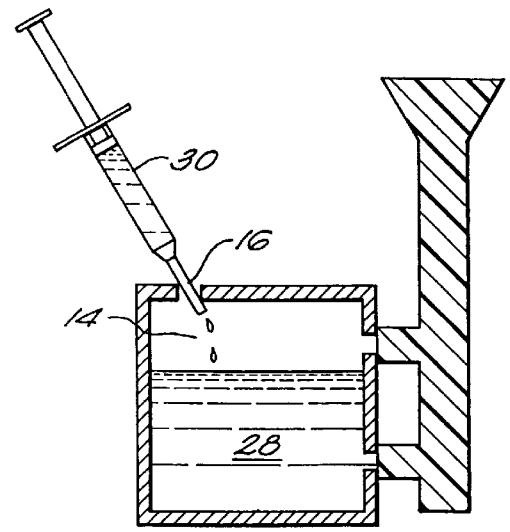
FIG. 2     FIG. 3
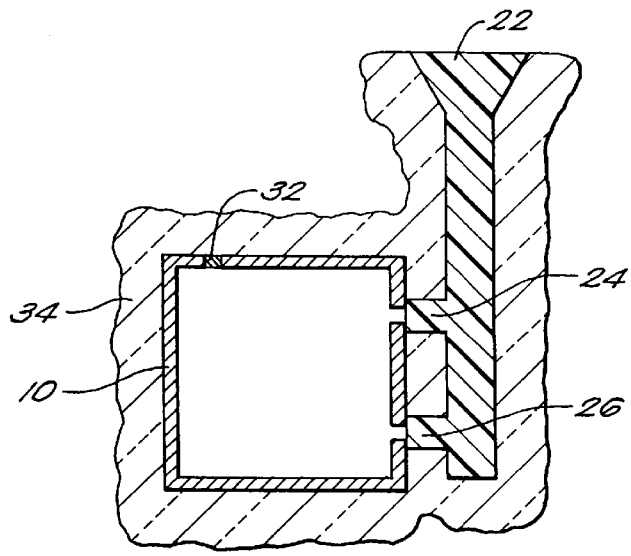
FIG. 4

METHOD OF PRODUCING INVESTMENT CASTINGS FOR STEREOLITHOGRAPHY PATTERNS

BACKGROUND OF THE INVENTION

Various metal casting processes, such as investment (or "lost wax") casting are well known for the fabrication of metal objects. This process requires several steps, the first of which is to create or provide a pattern or shape to be replicated. The pattern, often made of a heat destructible material such as wax or resin, is used to make a mold that is then used to form cast metal articles.

Typically, several wax patterns are joined together on a "tree" to enable the simultaneous manufacture of several parts. The tree is usually a solid wax or resin tube that has side walls to which a stem of each pattern is joined to form a cluster. The tree defines what will become a gate leading to passages for allowing molten metal to travel through the mold to each cluster and part pattern. Once all of the patterns are joined to the tree, the cluster is coated with one or more coats of a refractory material. This can be accomplished by dipping the pattern/tree assembly in a ceramic slurry.

After the slurry dries, fabrication of a shell or mold is completed by heating the slurry coated pattern/tree to cure or harden the ceramic and to burn-out the solid patterns and the tree. Molten metal is then poured into the shell so that it fills each of the cavities formerly occupied by the patterns and the tree. After the metal has cooled and hardened, the shell is fractured and removed, and the cast metal parts are severed from the metal tree. The cast parts are then subjected to post-machining, grinding off the gates, bead blasting, and polishing, as required.

The above-described burn-out step for removing heat destructible pattern/tree elements from a ceramic shell is commonly performed in an oven or furnace. Although resin is readily destroyed in this manner, it sometimes expands and cracks the shell while being heated. Wax is even more likely to expand and crack the shell. If the pattern/tree includes voids or hollow regions filled with gas, expansion of the gas can also cause the pattern to expand and the shell to crack. Thus, regardless of whether wax or resin are used individually or in combination to provide a solid or void-filled pattern/tree, a burn-out step performed in a furnace can cause substantial loss of ceramic shells due to pattern/tree material expansion or due to trapped gas expansion.

When a pressure differential exists between the interior and the exterior of the ceramic shell as the shell is being heated, regardless of how the pressure differential is created, the pressure differential can cause the shell to crack. To compensate for, or eliminate pressure differentials, it is known to create vents or bleeders in ceramic shells by filing down a portion of the ceramic shell to reveal or to create a pathway for low resistance airflow. Alternatively, a vent can be created in the ceramic shell by clearing slurry from a surface region of the pattern each time the pattern is dipped and before the slurry dries.

Regardless of how the hole or vent is formed, the hole must be repaired or sealed after the burn-out step and prior to metal pouring. The repair process, however, is labor intensive and can cause shell failure. Furthermore, the repair material may become dislodged, causing the hole to partially or completely reopen prior to, during, or after the step of pouring molten metal into the shell. This can result in spilled metal and a defective casting.

It is desirable to provide additional investment casting techniques that address the challenges of reducing mold failure, and more particularly the problems associated with hollow patterns, pattern removal, and pressure differentials.

SUMMARY OF THE INVENTION

The present invention provides a method that eliminates the need for vents or bleeders in or through a ceramic investment casting shell.

An exemplary method of forming an investment casting shell begins by providing an investment casting pattern that defines a cavity. The cavity is filled with a fluid, and the fluid is sealed within the cavity. Ceramic material is then applied to the investment casting pattern to envelop it. The ceramic material encasing the pattern is heated in a chamber at greater than atmospheric pressure until the pattern softens.

BRIEF DESCRIPTION OF THE DRAWINGS

Other features and benefits of the invention can be more clearly understood with reference to the specification and the accompanying drawings in which:

FIG. 1 illustrates a pattern for an investment cast article;

FIG. 1A illustrates an alternative embodiment of the pattern shown in FIG. 1;

FIG. 2 shows the pattern of FIG. 1 mated with an investment casting tree;

FIG. 3 shows the pattern of FIG. 2 being filled with fluid;

FIG. 4 shows the fluid filled pattern and tree of FIG. 3 coated with ceramic material;

DETAILED DESCRIPTION OF THE INVENTION

Figure 5:
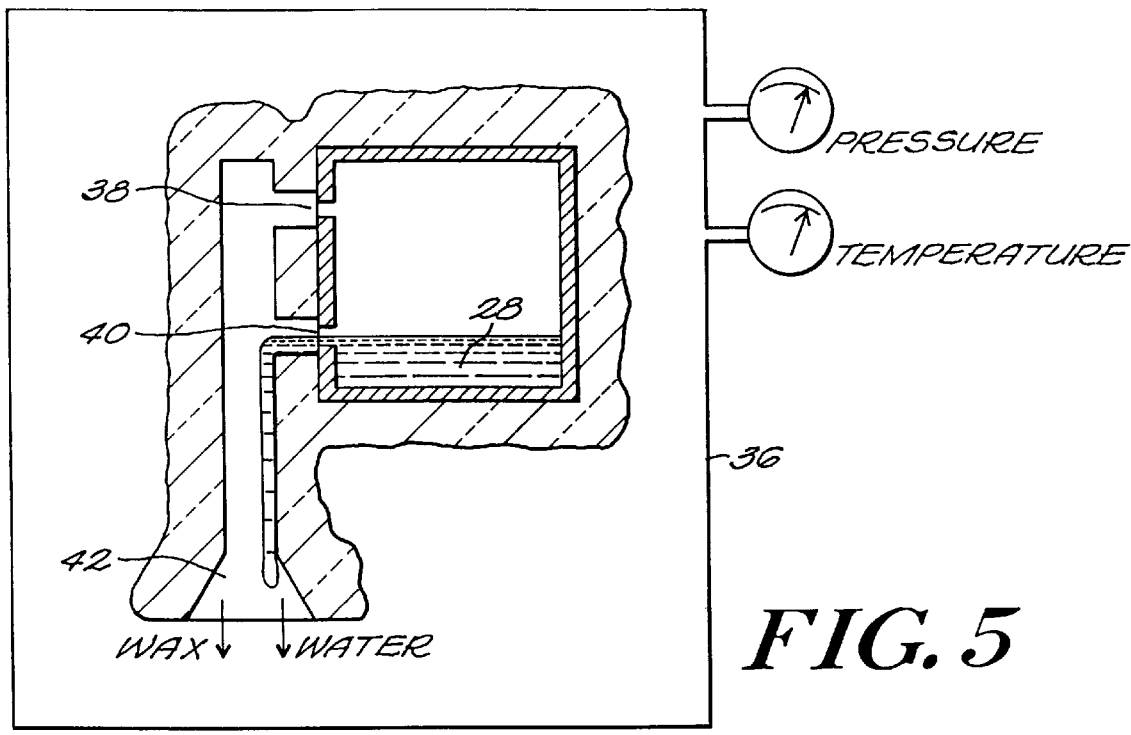
FIG. 5 shows the ceramic coated assembly of FIG. 4 being heated in an autoclave.

A method of producing an investment casting in accordance with the invention begins with the formation of a heat destructible pattern (hereinafter "pattern"). In an exemplary method, the pattern is made using stereolithograpic techniques and materials to provide a pattern that defines one or more cavities or voids. The pattern can have a completely solid or sealed surface that does not have any passage or aperture leading to the one or more cavities. Alternatively, one or more apertures and/or passages can be provided in or through the pattern surface that lead to or create one or more fluid paths to one or more cavities.

FIG. 1 illustrates an exemplary pattern 10 having a wall 12 that defines a cavity 14. The particular shape of the pattern 10 is not of importance to the method or to the discussion that follows. The wall 12 defines a first aperture 16, a second aperture 18, and a third aperture 20, wherein each of the apertures provides access to the cavity 14.

FIG. 1A illustrates a pattern 10' having many walls 12' that define many cavities or voids 14'. Passages 15 can be provided to provide fluid paths between one or more of the voids 14'. In an exemplary embodiment, a pattern 10' is provided that has a honeycomb configuration of voids 14'. Although not specifically described hereinafter, each of the method steps described below is applicable to a pattern 10' having multiple cavities 14'.

Embodiments of the method include providing patterns and/or trees made of autoclave compatible photo-curable resin such as Dupont's Somos® resin. As used herein, "autoclave compatible" resin designates a resin that does not swell appreciably due to absorption of water, particularly water at high temperatures (such as steam), even if water is capable of softening the cured resin over time (more than 24 hours). Other embodiments provide wax patterns and/or trees. Still other embodiments provide a wax pattern and a resin tree, a resin pattern and a wax tree, or a resin pattern and a resin tree.

In a subsequent step, illustrated by FIG. 2, the apertured pattern 10 is affixed to an investment casting tree 22 with wax or resin elements 24 and 26 that cover the second and third apertures 18 and 20, respectively, to define gates from the tree 22 to the pattern 10.

Referring now to FIG. 3, the cavity 14 within the pattern 10 is shown being filled with a fluid 28, such as water or polyethylene glycol. Although the fluid 28 can be poured, flowed, or otherwise deposited through the first aperture 16 in the pattern 10 until the cavity 14 is filled, a syringe like device 30 can be used to pierce the pattern in the absence of an aperture to inject fluid into the cavity.

After the pattern 10 is filled with fluid 28, the fluid is sealed within the cavity. In an exemplary method, the aperture (whether pre-formed in the pattern making step, or by piercing) is covered, sealed and/or filled with a heat destructible material 32, such as wax or hot-melt glue, as shown in FIG. 4.

In another embodiment (not shown), second and third apertures 18 and 20, respectively, are not provided and a single wax connecting element is used to both seal the first (and only) aperture 16 and to connect the liquid filled pattern 10 to the tree 22.

FIG. 4 shows the sealed, liquid-filled pattern 10, connecting elements 24, 26, and tree 22 covered with ceramic material 34 to provide an investment casting shell (hereinafter "shell"). The steps involved in coating a pattern to create a shell are known to those skilled in the art.

It should be noted that the present method does not include steps for providing a vent hole in or through the shell. Thus, by not intentionally introducing of a defect (vent hole) in the shell, the risk of shell failure is subsequently reduced. The deliberate omission of a vent hole also eliminates the risk of hole plugging material becoming dislodged from the hole.

Once the ceramic material 34 is sufficiently dry, the shell containing the liquid-filled pattern is heated to a temperature sufficient to soften the pattern. As used herein, "soften" includes material property changes such as reduction in compressive strength, shape deformation, and/or solid to liquid phase change. Soften with respect to resin can also mean that the resin has been weakened so that heating the resin in a high temperature burn-out step or a mold preheating step will not cause the resin to expand appreciably as it is destroyed.

As shown in FIG. 5, an exemplary method requires placing the shell and liquid-filled pattern in an autoclave 36. An autoclave, commonly used for moist-heat sterilization, is a chamber that contains high-temperature, pressurized steam. A typical autoclave pressure can be in the range of 50 psi to 200 psi, with a temperature in the range of 200° F to 400° F.

Heating the shell and its contents in an autoclave provides several notable benefits. For example, under pressure, wax elements will not expand and crack the shell. Also, resin, when autoclaved, becomes structurally weak (soft) and will not expand enough to crack a ceramic shell during a subsequent burn-out step.

As the autoclave is a pressurized environment, the stresses that can be created by pressure differential are of concern. For example, were a pattern/tree to include voids or hollow regions filled with air at normal atmospheric pressure (1 psi), the absence of vents can cause a shell surrounding the pattern/tree to crack or be crushed by the high pressure within the autoclave because there are no vents in the shell to equalize pressure. However, as the voids or cavities of the pattern of the present invention are filled with fluid, the problem of pressure differential is eliminated because fluids such as water are incompressible. The pattern, in effect, has become solid.

In addition to being incompressible, water is a particularly suitable fluid with which to fill the voids or hollow regions in a pattern, as water is a normal byproduct of autoclave operations and therefore does not create any waste requiring special treatment or disposal.

As the exemplary resin pattern 10 softens, the wax tree 22, and wax connecting elements 24, 26 melt, allowing the fluid 28 within the cavity 14 to flow out of the pattern 10. The water and melted wax then flow through channels 38, 40, and 42 defined by the now melted wax elements and tree. As the wax and water exit the ceramic shell, pressure equilibrium is maintained by in-rushing steam from the autoclave chamber. Thus, the ceramic shell is not stressed and it does not fracture. The resin pattern 10 remains behind in a softened state.

Figure 6:
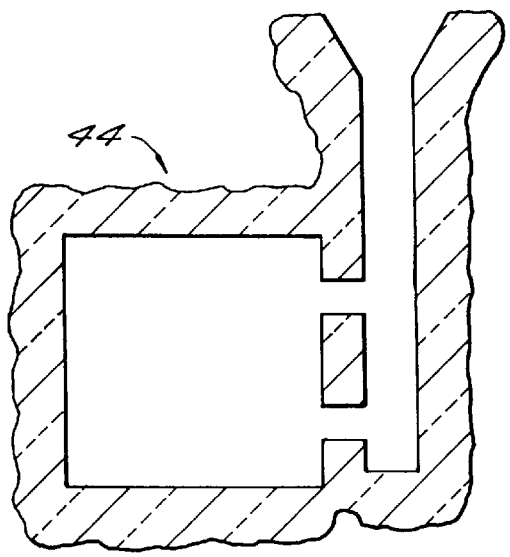
FIG. 6 depicts the ceramic shell of FIG. 5 with the pattern and tree removed.

After the fluid drains from the ceramic shell, the softened resin pattern 10, and any remnants of the tree 22 and wax elements 24, 26 can be removed from the shell in a high-temperature burn-out step or mold preheating step in preparation for receiving molten metal to provide a completed investment casting shell 44, as shown in FIG. 6.

Figure 7:
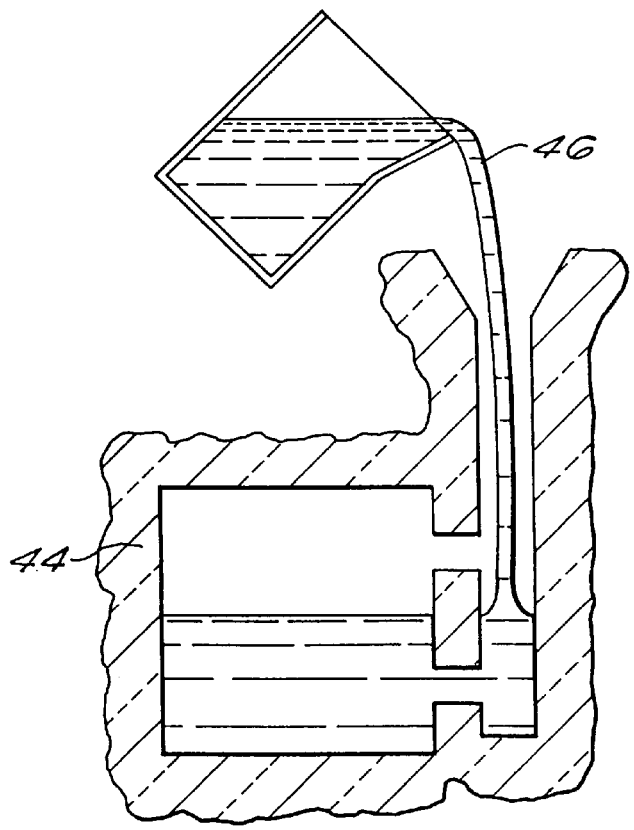
FIG. 7 illustrates molten metal being poured into the ceramic shell of FIG. 6.
Figure 8:
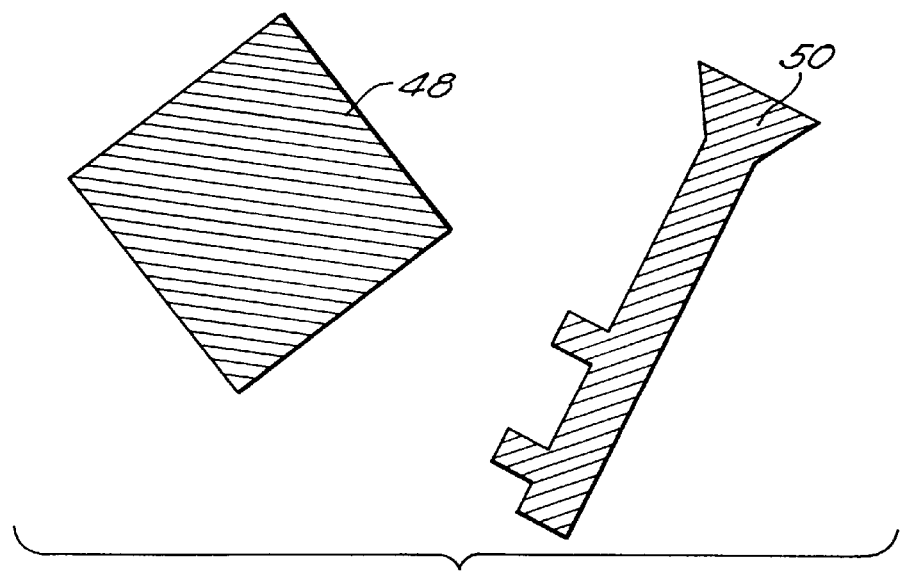
FIG. 8 shows the ceramic shell removed from hardened metal parts.

Subsequent steps include pouring molten metal 46 into the shell 44, as shown in FIG. 7; allowing the metal to cool and harden (not shown); removing the shell from the hardened metal (not shown); and separating the hardened metal 48 from the metal tree 50, as shown in FIG. 8.

Although the invention has been shown and described with respect to exemplary embodiments thereof, various other changes, omissions and additions in form and detail thereof may be made therein without departing from the spirit and scope of the invention.

What is claimed is:

1. A method of producing an investment casting shell comprising the steps of:

providing an investment casting pattern that defines a cavity;

filling the cavity with a fluid;

sealing the fluid within the cavity;

forming a ceramic mold around the investment casting pattern; and heating the ceramic mold until the investment casting pattern softens;

removing the investment casting pattern and the fluid from the ceramic mold.

2. The method of claim 1, wherein the step of providing an investment casting pattern includes the step of providing an investment casting pattern that includes a plurality of cavities.

3. The method of claim 2, wherein the plurality of cavities are linked with fluid passages.

4. The method of claim 2, wherein the plurality of cavities are individually sealed.

5. The method of claim 2, wherein the step of providing an investment casting pattern includes the step of stereolithographically forming an investment casting pattern with a resin.

6. The method of claim 1, wherein the step of filling the cavity with a fluid includes the steps of piercing the investment casting pattern to provide an aperture into the cavity, and flowing fluid through the aperture and into the cavity until the cavity is full of fluid.

7. The method of claim 6, wherein the step of sealing the fluid within the cavity includes the step of sealing the aperture with a heat softenable material.

8. The method of claim 7, wherein the heat softenable material includes wax.

9. The method of claim 7, wherein the heat softenable material includes hot-melt glue.

10. The method of claim 1, wherein the step of providing an investment casting pattern includes the steps of defining a pattern having a cavity therein, and defining an aperture that leads from an exterior surface of the pattern to the cavity.

11. The method of claim 1, wherein the step of heating includes the step of heating the ceramic mold in a pressurized chamber.

12. The method of claim 11, wherein the pressurized chamber contains steam at a pressure greater than atmospheric pressure.

13. The method of claim 12, wherein the pressurized chamber contains steam at a pressure in the range of 50 psi to 200 psi.

14. The method of claim 13, wherein the pressurized chamber contains steam at a temperature in the range of 200° F to 400° F.

15. A method of producing an investment casting shell comprising the steps of:

providing a resin pattern that defines a cavity;

providing an aperture in the resin pattern that opens into the cavity;

filling the cavity with water;

sealing the aperture with a heat meltable material;

forming a ceramic mold around the investment casting pattern; and heating the ceramic mold in pressurized chamber until the investment casting pattern softens; and removing the investment casting pattern and the water from the ceramic mold.

* * * * *